United States Patent [19]

Chenier et al.

[11] Patent Number: 4,974,225

[45] Date of Patent: Nov. 27, 1990

[54] DATA RECEIVER INTERFACE CIRCUIT

[75] Inventors: Marcel Chenier, Hull; Brian Wale, Orleans, both of Canada

[73] Assignee: Northern Telecom Limited, Montreal, Canada

[21] Appl. No.: 407,164

[22] Filed: Sep. 14, 1989

[51] Int. Cl.[5] .............................................. H04J 3/06
[52] U.S. Cl. .................................................. 370/105.1
[58] Field of Search .................. 370/105.1, 105.2, 102, 370/108, 100.1; 375/118

[56] References Cited

U.S. PATENT DOCUMENTS

| | | | |
|---|---|---|---|
| 3,928,727 | 12/1975 | Roche | 370/105.2 |
| 4,282,600 | 8/1981 | Zemanek | 370/105.1 |
| 4,323,790 | 4/1982 | Dunning et al. | 370/102 |
| 4,353,129 | 10/1982 | Nishiwaki | 370/108 |
| 4,596,026 | 6/1986 | Cease et al. | 370/108 |

Primary Examiner—Douglas W. Olms
Assistant Examiner—Alpus H. Hsu
Attorney, Agent, or Firm—F. P. Turpin

[57] ABSTRACT

A data receiver interface circuit is provided with a circuit for accepting correctly framed data. The plurality of data bits sandwiched between a pair of frame pulses is temporarily stored while the number of clock cycles occurring between the frame pulses is determined to be a valid number. The data is accepted by the receiver if the number of clock cycles occurring between the pair of successive frame pulses is a valid number.

14 Claims, 2 Drawing Sheets

DATA RECEIVER INTERFACE CIRCUIT

FIELD OF THE INVENTION

This invention relates generally to a data receiver interface circuit and more particularly to a method and apparatus for accepting data which is correctly framed within predetermined criteria.

BACKGROUND OF THE INVENTION

Many data transmission systems send and receive framed serial data. Each frame of data is identified with a frame pulse that separates it from the preceding frame of data. This frame boundary may be used for alignment of the data being transmitted. For example, when a stream of bits is being transmitted in a multi-channel arrangement, where each channel has ten bits, the first bit represents bit 1 of channel 1, the second bit represents bit 2 of channel 1 ... the 10th bit represents bit 10 of channel 1 and the 11th bit represents bit 1 of channel 2. The first bit of each channel is a frame pulse and bits 2 to 10 are typically comprised of data bits, however some schemes may provide for bit 2 of each respective channel to be used for verification such as parity. A receiver receiving the serial stream of bits uses the frame pulses for aligning the data bits with their respective channels. Thus frame pulses are used to demark the boundary of clusters of data and provide the receiver with a frame of reference.

The transmission of framed data is shown in a prior art elastic storage circuit for use in a telephone switching system described in U S. Pat. bearing the No. 4,323,790 in the name of Stephen C. Dunning et al. This circuit employs a means of detecting first-in first-out (FIFO) memory overflow or underflow due to a chronic increase or decrease in the frequency rate of the data. The FIFO temporarily stores the data portion of a serial stream having been framed by frame pulses. This circuit does not provide a means of monitoring data corruption.

Data is said to be correctly framed when the number of clock cycles between pairs of successive frame pulses is equal to a predetermined number. However, it is not uncommon for corrupt data to be received at a node of a transmission system; the cause of the data corruption may be unstable clock sources, noise in the system, poor connections, or a myriad of other causes. Often, it is found that extra clock cycles or too few clock cycles occur between two successive frame pulses in a system where the train of frame pulses should be periodic and thus have a predetermined number of clock cycles between each pair thereof. If this situation goes undetected a large amount of corrupt data may be accepted by the receiver before an error control mechanism is able to detect the problem and initiate corrective action. Most of the known data receivers use an input stage that includes an elastic buffer usually in the form of a FIFO. Presently available commercial FIFOs commonly provide fifo-full and fifo-empty indications to denote overflow and underflow conditions as well as read and write pointers. However it is not possible to use the read and write pointers to monitor the contents of the FIFO since they are internal to the devices.

It is thus an object of the invention to provide a novel circuit and method for accepting correctly framed data by detecting if the number of clock cycles between two successive frame pulses is equal to a predetermined number, and accepting the data if the number of clock cycles is equal to the predetermined number.

SUMMARY OF THE INVENTION

In accordance with the invention, there is provided a method of accepting correctly framed data comprising the steps of storing the data in a storage device, counting the number of clock cycles that occur between successive frame pulses, and accepting the stored data if the number of clock cycles equals a predetermined number.

From another aspect, the invention provides a circuit for accepting correctly framed data. A storing means receives and stores incoming data and a counting means is responsive to the received data for providing a count corresponding to the number of bits between each pair of successive frame pulses. A control circuit compares the count with a predetermined number and provides an output signal upon correlation thereof. The data in the storing means is then released to a data receiver.

DETAILED DESCRIPTION OF THE PREFERRED EMBODIMENT

Figure 1:
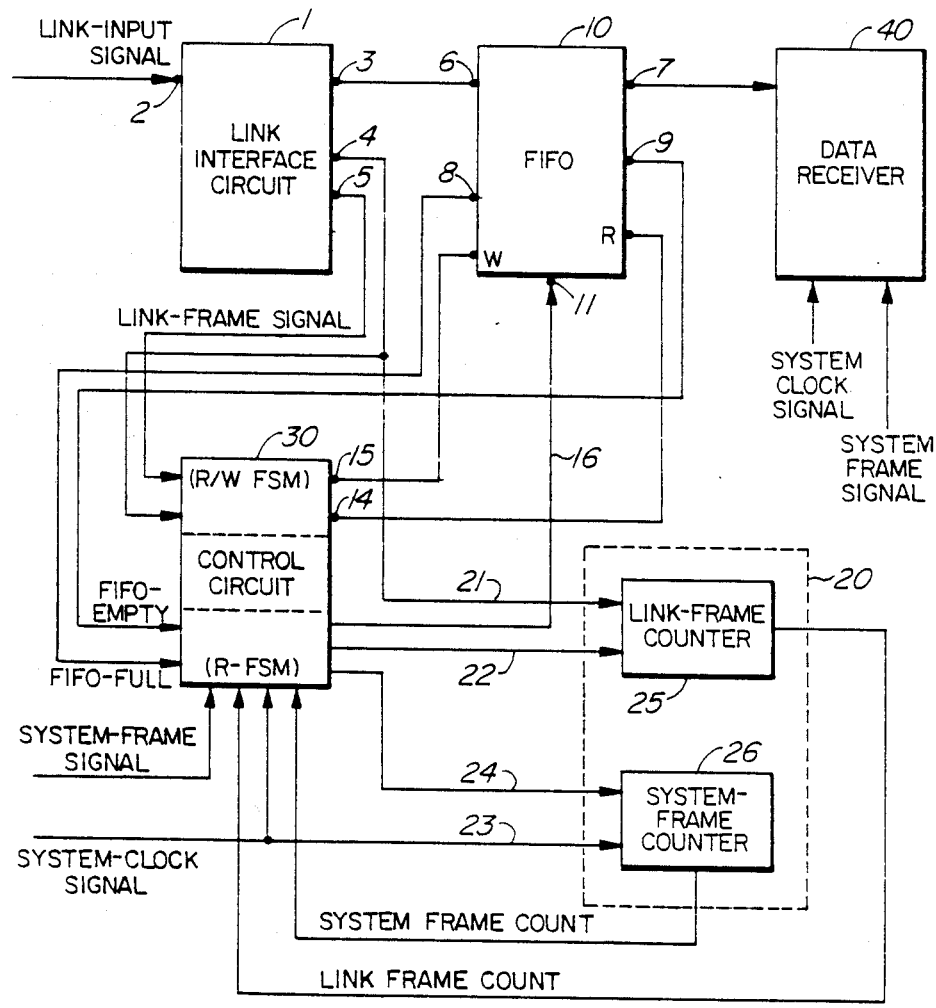
Figure 2A:
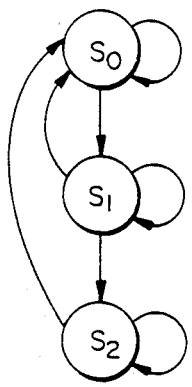
Figure 2B:
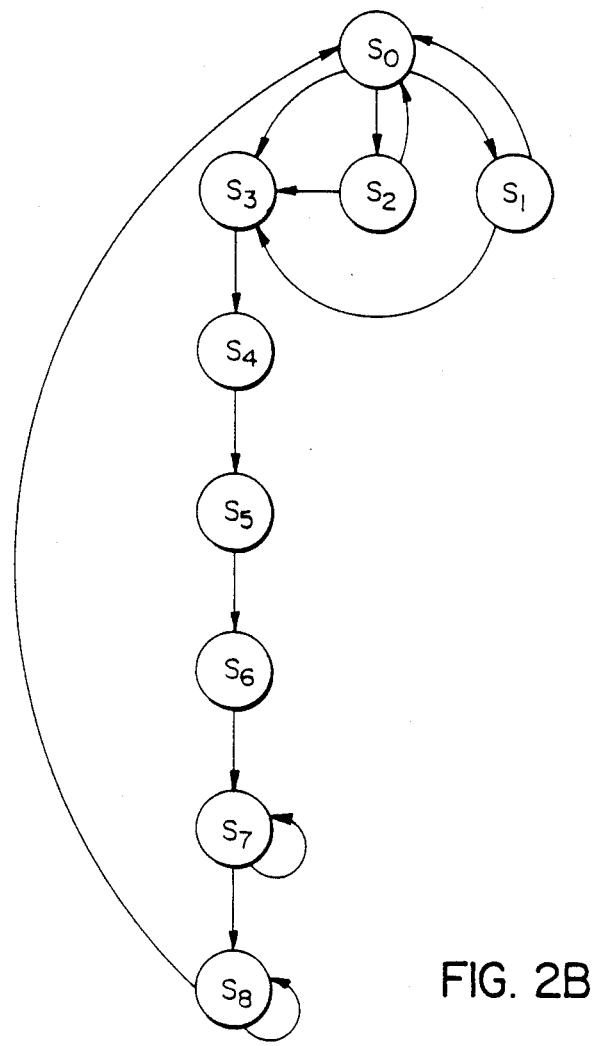

An embodiment of the invention will now be described in conjunction with the drawings in which:

FIG. 1 is a block diagram of the data accepting circuit of the present invention; and FIGS. 2A and 2B are state diagrams of a read-write finite state machine (R/W-FSM) and a reset finite state machine (R-FSM) respectively, illustrating the operation of the circuit of FIG. 1.

Referring now to FIG. 1, a link-interface circuit 1 is shown having a data input terminal 2 for receiving an input signal from a data link. The input signal is a biphase encoded signal having data periodically framed within successive frame pulses. As is generally known, a biphase encoded signal encodes data, framing information, and clocking information which may be recovered therefrom. The encoding is as follows: a logic 1 is encoded as 0,1, a logic 0 is encoded as 1,0 and a biphase violation representing a frame pulse is encoded as three consecutive ones or zeros. Since the link input signal is typically a serial stream of bits having data bits and frame bits serially combined, it is necessary to separate the data bits and the frame bits. As is well known in the art and exemplified in U.S. Pat. No. 4,323,790, the link interface circuit 1 shown in FIG. 1 provides a means for receiving the link data input signal and for separately recovering data, clock and framing information. The link interface circuit 1 has a first output terminal 3 for providing a link-data signal, a second output terminal 4 for providing a link-clock signal and a third output terminal 5 for providing a link-frame signal. These three signals are derived from the composite link input signal.

A data receiver 40 reads data quasi-synchronously. A quasi-synchronous arrangement is one wherein a receiver and transmitter have clock signals of the same frequency however communication between the transmitter and receiver is asynchronous. Typically, an elastic buffer such as first-in first-out buffer is used to temporarily store data in an asynchronous communication scheme.

A first-in first-out buffer (FIFO) 10 has an input terminal 6 connected to the data output terminal 3 of the interface circuit 1 and serves to temporarily store a portion of the link data signal which may then be outputted on terminal 7 to a data receiver 40. As is conventional for such devices, the FIFO 10 has a fifo-full terminal 8 and a fifo-empty terminal 9, a reset terminal 11, a read terminal R and a write terminal W. A control circuit 30 is adapted to control the operation of the FIFO 10 in response to signals from the interface circuit 1, a counting circuit means 20 and the FIFO 10. The control circuit 30 is connected to the output terminals 4 and 5 of the interface circuit 1 for receiving the derived link-clock signal and the derived link frame signal respectively. In order for the data receiver 40 to function with the circuit of the invention, it provides the control circuit 30 with a system-clock signal having the same frequency as the link-clock signal and a system-frame signal having the same frequency as the link-frame signal.

The control circuit 30 is basically a network of logic gates interconnected to output predetermined control signals when predetermined input signals are asserted. The circuit 30 may therefore be considered to be a finite state machine (FSM). In fact the control circuit 30 may be logically divided into a read/write state machine (R/W-FSM) and a reset state machine (R-FSM) as shown in FIG. 1.

The counting circuit means 20 has first and second binary counters 25 and 26 for counting clock cycles within any given frame of data. The first counter 25 is responsive to the link-clock signal on line 21 and a delayed-link-frame signal on a first clear line 22 to generate a link frame count representing the number of clock cycles between frame pulses in the link input signal. Similarly, the second counter 26 is responsive to a system clock signal on input line 23 and a delayed-system-frame signal on input line 24 to generate a system frame count representing the number of system clock signals that exist between system frame pulses in the system frame signal. Both the delayed-link-frame and the delayed-system-frame signals are derived from the link-frame and system-frame signals respectively in control circuit 30, and they follow their respective original signal in time, being shifted in time from them by one clock cycle. The counters 25 and 26 provide their respective output signals to the control circuit 30.

The counter 26 and related circuitry serve to monitor the operational relationship between the data receiver 40 and the FIFO 10 by insuring that the receiver is capable of reading the contents of the FIFO properly.

In operation, the link interface circuit 1 receives the link input signal which, as discussed above, is a composite serial signal composed of data and frame bits as well as clocking information. The interface circuit 1 decodes the received signal into the link-data signal, the link-clock signal and the link-frame signal. The control circuit 30 receives the link-clock signal, the link-frame signal, the system clock signal, the system-frame signal, the fifo-full signal, the fifo-empty signal, the link and system frame counts, and generates the write, read or reset signals to the FIFO 10 in dependence upon the state of the received signals. When the write signal is asserted, the FIFO 10 receives the link-data signal and stores data bits sequentially until the read signal or the reset signal is asserted. Upon assertion of the read signal the data bits are read out of the FIFO 10 by the data receiver 40. The FIFO 10 is used as a temporary buffer to store the data while the control circuit 30 determines if the data is correctly framed. When the reset signal is asserted, the FIFO 10 flushes all its data. This process of flushing may simply be achieved by resetting the read and write pointers within the FIFO 10 instead of actually erasing the stored data.

The first and second counters 25 and 26 operate in the same manner but have different input and output signals. The count of the first counter 25 is incremented by the link clock signal and is reset upon assertion of the delayed-link frame signal which is generated by the control circuit 30. The control circuit 30, in response to the link-frame signal compares the count represented by the link frame count to a predetermined number. If the count and the predetermined number are equal, the read signal is generated by the control circuit 30 in dependence upon the system-clock signal and the system-frame signal being asserted, and data stored in the FIFO 10 may be read. The count cf the second counter 26 is incremented by the system-clock signal and the second counter is reset upon assertion of the delayed-system-frame signal. Before generating the read signal the integrity of the system-frame signal is verified by determining if the system-frame signal has the correct number of clock cycles between successive frame pulses. If the number of clock cycles between frame pulses is incorrect, the control circuit 30 generates the reset signal to clear the contents of the FIFO 10.

The following description of operation may be better understood by reference to FIG. 2A which illustrates the functions of the R/W-FSM and FIG. 2B which illustrates the functions of the R-FSM.

The following psuedo code represents the operation of the R/W-FSM:

| State 0: | read signal not generated |
| --- | --- |
| | write signal not generated |
| | READING=false |
| | If no reset present |
| |     if link-frame signal present go to State 1 |
| | else go to State 0 |
| State 1: | read signal not generated |
| | write signal generated |
| | READING=false |
| | if no reset present |
| |     if system-frame signal present go to State 2 |
| |     else idle waiting for system-frame signal |
| | else go to State 0 |
| State 2: | read signal generated |
| | write signal generated |
| | READING=true |
| | if no reset present go to State 2 |
| | else go to State 0 |

The read/write FSM will wait in State 0 after the reset signal has been asserted until the link-frame signal is present. When the first link-frame pulse occurs the R/W-FSM will assert the write signal and data will be written into the FIFO. If the system-frame signal is generated, State 2 is executed from State 1 and the FIFO is read.

The following psuedo code represents the operation of the reset FSM.

| State 0: | If READING = true and fifo-empty asserted then go to State 3; |
| --- | --- |
| | if fifo-full go to State 3 |
| | if link-frame signal present go to State 1 |
| | if system-frame signal present go to State 2 |
| | go to State 0 |
| State 1: | if link__frame__count not equal to predetermined__value |
| |     then go to State 3 |
| | else go to State 0 |
| State 2: | if system__frame__count not equal to predetermined__value then go to State 3 |
| | else go to State 0 |
| State 3: | Reset__read/write__FSM = true |

|         | -continued |
|---------|------------|
|         | go to State 4 |
| State 4: | Reset signal = true |
|         | go to State 5 |
| State 5: | Reset signal = false |
|         | go to State 6 |
| State 6: | Reset_read/write_FSM = false |
|         | go to State 7 |
| State 7: | if link-frame signal present go to State 8 |
|         | else go to State 7 |
| State 8: | if system-frame signal present go to State 0 |
|         | else go to State 8 |

State 0 is the idle state wherein the R-FSM is monitoring for either full or empty conditions. State 1 and 2 go to state 3 if the link frame count is not equal to the predetermined value. State 3 and 6 are error states. The reset_read/write FSM signal first resets the R/W-FSM and the assertion of the reset signal resets the FIFO. States 7 and 8 wait until the start of the next frame before going back to the idle state 0.

Conveniently the control circuit 30 may be realized using one or more programmable array logic devices suitably configured to function as the R/W-FSM and R-FSM. Similarly the counters 25 and 26 may be realized using the same or another programmable logic device array; A programmable array logic (PAL) device may conveniently be a commercial device manufactured by companies such as Advanced Micro Devices of Sunnyvale, Calif. Typically, such a device comprises clusters of logic gates that may be configured to provide a variety of logic functions.

The circuit of the invention therefore allows a data link interface circuit that uses a commercially available monolithic FIFO to accept correctly framed data.

With the addition of a minimal amount of circuitry to a conventional data receiver interface circuit, the invention provides an economic and effective way of rejecting corrupt data due to incorrect framing.

What is claimed is:

1. A method of accepting correctly framed data framed between a pair of successive frame pulses, the pair of frame pulses being separated by a plurality of clock cycles, the method comprising the steps of:
   (a) storing the data in a storage device;
   (b) counting the clock cycles that occur between the pair of successive frame pulses; and
   (c) accepting the stored data if the counted number of clock cycles equals a predetermined number.

2. A method as defined in claim 1 wherein the step of accepting comprises the step of permitting the stored data to be read out of the storage device.

3. A method as defined in claim 1 wherein the step of storing comprises the step of writing the data bits having a predetermined order into a storage device and preserving the order of the bits.

4. In a transmission system for transporting framed serial data wherein each pair of successive frame pulses frames a plurality of bits each one corresponding to a clock pulse, the system comprising a data receiver having an interface circuit adapted to extract clock and frame information from the serial data, a method of accepting only correctly framed data comprising the steps of storing in a storage device each plurality of bits, counting the extracted clock cycles corresponding to the plurality of bits, and accepting the stored data only if the counted number of clock cycles equals a predetermined number.

5. A method as defined in claim 4 wherein the step of accepting comprises the step of allowing the stored data to be read out of the storage device.

6. A method as defined in claim 4 and comprising the further steps of overwriting the data in the storage device with the next plurality of bits if the counted number of clock cycles does not equal the predetermined number.

7. A method as defined in claim 5 and further comprising the steps of counting the clock cycles between each pair of framing pulses received from the receiver and preventing the data in the storage device from being read out if the count of the receiver clock cycles does not correspond to the count of extracted clock cycles.

8. A circuit for accepting data framed between a pair of successive frame pulses, each pair of frame pulses being separated by a plurality of data bits, each corresponding to a clock cycle, the circuit comprising:
   a storage device for temporarily storing the data;
   a counting means responsive to control signals for counting the clock cycles between the successive frame pulses; and
   a control circuit for generating signals for controlling the storing and counting of the data bits and for permitting the data stored in the storage device to be read if the counter number of clock cycles corresponds to a predetermined number.

9. A circuit for accepting data as defined in claim 8 wherein the counting means comprises a binary counter.

10. A circuit for accepting data as defined in claim 8 wherein the storage device is a first-in first-out buffer.

11. A circuit for accepting data as defined in claim 8 wherein the control circuit is a programmable array logic device configured to provide the functions of the control circuit.

12. A circuit as defined in claim 10 wherein the first-in first-out buffer is a commercial monolithic device.

13. An interface circuit for interfacing a serial data link carrying framed data to a data receiver, the interface circuit including a recovery circuit for recovering clock and frame information from the serial data and for providing link-clock signals and link-frame signals corresponding to the recovered clock and frame information, the interface circuit including a first circuit for causing only correctly framed data to be received by the receiver, the first circuit comprising:
   a storage device for storing the received data, the storage device being suitable to store at least an amount of data corresponding to one frame of correctly framed data;
   a counter means responsive to recovered clock and frame information for providing a count signal corresponding to the number of bits between each pair of received frame bits; and
   a control circuit for controlling the storing and counting of the data bits and for allowing the data stored in the storage device to be read out only when the count signal associated with the stored data corresponds to a predetermined number.

14. A circuit as defined in claim 13 wherein the counter means is also responsive to clock and frame signals from the receiver to provide a count signal corresponding to the number of bits between each pair of received frame bits from the receiver, the control circuit further comprising means for verifying that the timing of the receiver corresponds to that of the framed data on the serial data link.

* * * * *